W. W. MINER & B. BEVELANDER.
Reel for Coiling Metal Strips.

No. 222,148.  Patented Dec. 2, 1879.

Witnesses
Lawrence F. Connor.
J. F. Cronin

Inventor.
William W. Miner
and Benj. Bevelander
by Crosby & Gregory
Attys

UNITED STATES PATENT OFFICE.

WILLIAM W. MINER AND BENJAMIN BEVELANDER, OF BOSTON, MASSACHUSETTS, ASSIGNORS TO GLOBE NAIL COMPANY, OF SAME PLACE.

IMPROVEMENT IN REELS FOR COILING METAL STRIPS.

Specification forming part of Letters Patent No. 222,148, dated December 2, 1879; application filed May 1, 1879.

*To all whom it may concern:*

Be it known that we, WM. W. MINER and BENJ. BEVELANDER, both of Boston, county of Suffolk, State of Massachusetts, have invented an Improvement in Reels for Winding or Coiling Metal Strips, of which the following description, in connection with the accompanying drawings, is a specification.

This invention relates to a reel or mechanism by which it is possible to wind metal, as nail-plate and hoop-iron, leather, or other belting, &c.; and the invention consists, chiefly, in a reel provided with clamping mechanism, actuated as hereinafter described, to automatically grasp the end of the material to be wound, and to release it at the proper time, so as to permit the material to be removed from the reel.

Figure 1:
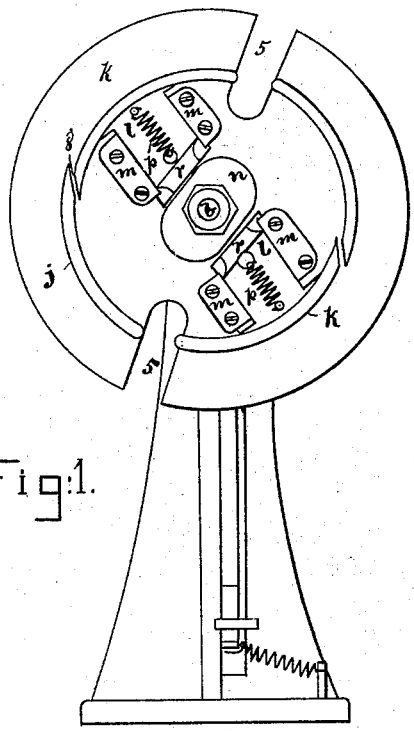
Figure 2:
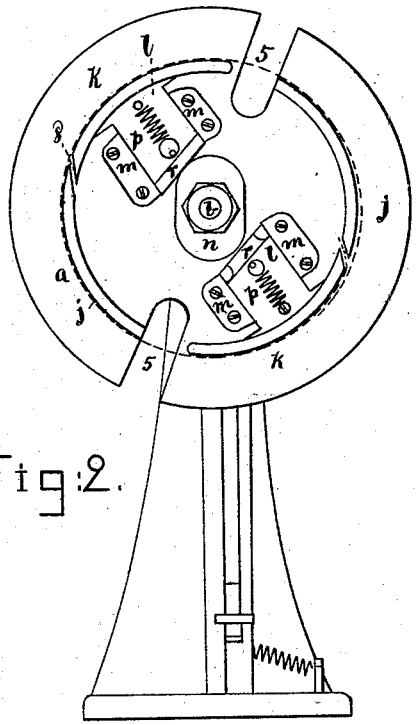

Figure 1 represents, in front elevation, a reel embodying our invention, the clamping portion thereof being opened; Fig. 2, a similar view, the clamping portion being closed; and Fig. 3 is a side elevation.

The main disk $a$ of the reel is mounted loosely upon shaft $b$, near its end, the shaft being held in a suitable bearing, as at $c$. The shaft $b$ has attached to it, by a key or spline, 2, a clutch part, $d$, made longitudinally movable along the shaft by an elbow-lever, $e$, pivoted at 3, and connected by a link, $f$, with a foot-treadle, $g$, lifted by a spring, $h$.

Figure 3:
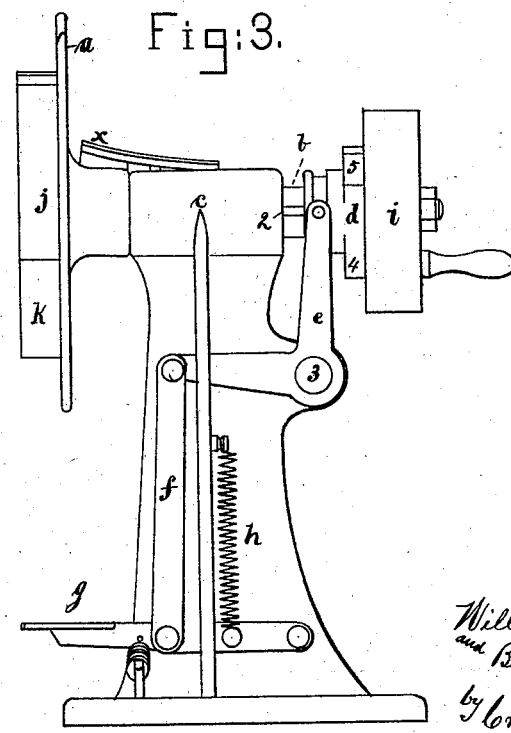

The clutch part $d$ has one or more lugs, 4, which, when the said part $d$ is in the position shown in Fig. 3, engages with a projection, 5, on the driven pulley $i$, mounted loosely upon shaft $b$, and causes the said pulley, with its lugs 5, forming one-half the clutch, to engage the other half, $d$, and rotate the shaft $b$.

The disk has one or more fixed receiving-flanges, $j$ $j$, and one or more movable clamping-flanges, $k$ $k$, (in this instance made as segments,) about and upon which the strip of metal or nail-plate is to be wound, the shape of the pieces $j$ $k$ and their size governing the shape and area of the space at the center of the coil of material.

The movable receiving-flanges $k$ are, in this instance, shown as carried by slides $l$, made movable in guideways $m$ under the action of a cam, $n$, a spring, $p$, holding the end $r$ of the slide against the cam $n$. This cam is fixed upon the shaft $b$, and when the reel composed of the parts $a$ $j$ $k$ is in the position shown in Fig. 1, the movable parts, acted upon by the spring $p$, are drawn toward the axis of the shaft $b$, so as to leave spaces 8 between the ends of $j$ $k$, in either of which may be entered the end of the thing to be wound into a coil.

The shaft $b$, being partially rotated, starts the cam $n$, the reel being loose, and the cam forces the flanges $k$, with slides $l$, outward, as in Fig. 2, bringing the ends of $j$ $k$ together, so as to bite the end of the material snugly, and then the further rotation of the shaft $b$ and its cam $n$ carries with it the reel and winds the material in coil form about the receiving and clamping flanges $j$ $k$.

After the proper amount of material has been placed upon the reel, it may be tied or wired by inserting a wire about the coil through the slots $s$.

To remove the coiled material, stop the rotation of shaft $b$ by depressing the treadle, thereby moving $d$ away from its engagement with pulley $i$ or lug 5. Then turn the reel backward by hand for part of a revolution, or far enough to permit the spring $p$ to draw the flange $k$ inward and release the end of the strip, after which the material may be removed laterally from the flanges $j$ $k$.

Referring to the drawings, Fig. 1, it will show that the length of the receiving-flanges $j$ of the reel, upon which are wound the metal strips, are of less length, or occupy a less portion of the arc of a circle, than do the movable flanges $k$ plus the spaces 5. This construction is essential, as it permits the coiled metal strip to be easily removed from the narrow flanges $j$, which occupy but a small part of the arc of a circle.

The flanges $k$ might be pivoted at one end, and be acted upon between their ends by a suitable cam, so as to throw the said flanges outward to grasp an end of the material to be wound, one flange, $k$, thus co-operating with the other flange, $j$, and acting as a clamp for the end of the material.

The friction device $x$ holds the reel back when the cam and shaft begin to rotate.

The receiving-flanges $j$ are, it will be noticed, quite narrow, and in practice need be but little, if any, wider than the width of the strip of nail-plate to be wound.

The end of the strip to be wound is so held by the movable flange $k$ that successive coils or layers of the nail-plate are wound one upon the other, as in an ordinary coil of tape.

We claim—

1. In a reel for winding a strip of metal plate, one coil or layer directly and closely upon and outside of another coil or layer, the disk $a$, having fixed receiving-flanges $j$, combined with a radially-movable flange, $k$, located within the flanges $j$, and with the shaft $b$ and devices, substantially as described, to operate the movable clamping-flange $k$, to hold the end of the strip of metal plate within the circle of the flanges $j$, as and for the purpose described.

2. The receiving-flange $j$ and the radially-movable flange $k$, combined with a cam to operate the movable flange, substantially as described.

3. The disk $a$, provided with the fixed receiving-flanges and the clamping-flanges, combined with a cam fixed upon the shaft, and located to first actuate the clamping-flanges to grasp the end of the material to be wound, and then to rotate the disk and receiving-flanges, substantially as described.

4. The disk $a$, held loosely upon the shaft $b$, and provided with fixed flanges $j$ and the movable flanges $k$, and a cam fixed on the shaft to actuate the movable flanges $k$ automatically, combined with the shaft $b$, the driving-pulley, and a clutch to engage the shaft with the driving-pulley and disengage it therefrom, substantially as described.

5. The fixed receiving-flange $j$ and the movable clamping-flange, and a shaft and cam to actuate it to clamp the end of the strip to be wound into a coil, layer upon layer, combined with a friction device, substantially as described, to hold the disk stationary until the shaft moves far enough to actuate the clamping-flange and grasp the strip to be wound, substantially as described.

In testimony whereof we have signed our names to this specification in the presence of two subscribing witnesses.

WILLIAM W. MINER.
BENJAMIN BEVELANDER.

Witnesses:
G. W. GREGORY,
L. F. CONNOR.